United States Patent [19]
Macpherson

[11] Patent Number: 5,943,640
[45] Date of Patent: Aug. 24, 1999

[54] TESTING APPARATUS FOR DIGITAL STORAGE DEVICE

[75] Inventor: Bryon P Macpherson, Frederick, Colo.

[73] Assignee: Maxtor Corporation, Longmont, Colo.

[21] Appl. No.: 09/051,684

[22] PCT Filed: Oct. 25, 1995

[86] PCT No.: PCT/US95/13774

§ 371 Date: Apr. 16, 1998

§ 102(e) Date: Apr. 16, 1998

[87] PCT Pub. No.: WO97/15930

PCT Pub. Date: May 1, 1997

[51] Int. Cl.$^6$ ................................................ G11C 29/00
[52] U.S. Cl. .................... 702/183; 702/185; 714/704; 714/723
[58] Field of Search .................. 702/183, 185, 702/119; 371/21.1, 21.6, 5.1; 714/704, 706, 718, 723

[56] References Cited

U.S. PATENT DOCUMENTS

| | | | |
|---|---|---|---|
| 3,704,363 | 11/1972 | Salmassy et al. | 371/5.1 |
| 4,348,761 | 9/1982 | Berger | 371/21.1 |
| 4,710,925 | 12/1987 | Negi | 714/704 |
| 5,333,084 | 7/1994 | Galloway et al. | 360/77.07 |
| 5,422,890 | 6/1995 | Klingsporn et al. | 371/21.6 |
| 5,572,659 | 11/1996 | Iwasa et al. | 714/710 |

*Primary Examiner*—Kamini Shah
*Assistant Examiner*—Bryan Bui
*Attorney, Agent, or Firm*—David M. Sigmond

[57] ABSTRACT

An apparatus for testing electro-mechanical storage devices, such as disk drives, is provided. A testing device (14) in a digital computer (10) selects test parameters from an array of test parameters stored in the digital computer (10). A random number generator is used in the selection of the test parameters. When errors occur, the array of test parameters is dynamically adapted during testing to change the probability of selecting certain test parameters in response to the error.

34 Claims, 4 Drawing Sheets

| COLUMN 0 INITIAL SETTING | COLUMN 1 FIRST UPDATE | COLUMN 2 2ND UPDATE | COLUMN 3 3RD UPDATE | COLUMN 4 4TH UPDATE | COLUMN 5 5TH UPDATE | COLUMN 6 6TH UPDATE |
|---|---|---|---|---|---|---|
| 0 | 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |
| 6 | 6 | 6 | 6 | 6 | 6 | 6 |
| 7 | 7 | 7 | 7 | 7 | 7 | 7 |
| 8 | 8 | 8 | 8 | 8 | 8 | 8 |
| 9 | 9 | 9 | 9 | 9 | 9 | 10 |
| 10 | 10 | 10 | 10 | 10 | 10 | 11 |
| 11 | 11 | 11 | 11 | 11 | 11 | • |
| • | • | • | • | • | • | • |
| • | • | • | • | • | • | • |
| • | • | • | • | • | • | 1021 |
| 1021 | 1021 | 1021 | 1021 | 1021 | 1021 | 1022 |
| 1022 | 1022 | 1022 | 1022 | 1022 | 1022 | 1023 |
| 1023 | 1023 | 1023 | 1023 | 1023 | 1023 | |
| | 9 | 9 | 9 | 9 | 9 | |
| | | 9 | 9 | 9 | 9 | |
| | | | 9 | 9 | 9 | |
| | | | | 9 | 9 | |
| | | | | | 9 | |

Fig. 2

| COLUMN 1 INITIAL | | COLUMN 2 NEW WEIGHTING | |
| --- | --- | --- | --- |
| WT | CYL | WT | CYL |
| 1-10 | 1 | 1-5 | 1 |
| 11-20 | 2 | 6-10 | 2 |
| 21-30 | 3 | 11-15 | 3 |
| 31-40 | 4 | 16-20 | 4 |
| 41-50 | 5 | 21-25 | 5 |
| 51-60 | 6 | 26-30 | 6 |
| 61-70 | 7 | 31-35 | 7 |
| 71-80 | 8 | 36-90 | 8 |
| 81-90 | 9 | 91-95 | 9 |
| 91-100 | 10 | 96-100 | 10 |

Fig. 4

TESTING APPARATUS FOR DIGITAL STORAGE DEVICE

CROSS-REFERENCE TO RELATED APPLICATIONS

This application is a national stage application filed under 35 U.S.C. § 371 based on international application no. PCT/US95/13774 filed Oct. 25, 1995.

FIELD OF THE INVENTION

The present invention relates to testing of digital storage devices and, in particular, changing the weighting of an array of test parameters to increase the probability of errors.

BACKGROUND OF THE INVENTION

Digital storage devices, in particular disk storage devices, are typically tested through the use of scripted tests which cause the device to perform according to predetermined test parameters, command sequences and command conditions. Errors generated as a result of the test are normally logged. As it is usually not practical to test all possible permutations of commands and conditions, scripted tests generally contain a set of selected test parameters. As a result, many infrequently occurring errors may be overlooked in testing. Scripted tests have failed to identify a significant number of errors that are experienced by the end users of the disk storage devices. It would, therefore, be advantageous to cause the testing of the device to identify errors that a conventional scripted test typically fails to identify, so that, if possible, the cause of such errors can be corrected before the errors are experienced by end users of the devices.

SUMMARY OF THE INVENTION

In accordance with the present invention, an apparatus is provided for testing an electro-mechanical digital storage device by providing selected test parameters to the device in a manner that addresses the deficiencies associated with the use of scripted tests. The apparatus includes a digital computer, a first interface for transferring information between the apparatus and a test operator or another device, an array of test parameters, a device for selecting a test parameter from the array and a second interface for transferring information that is related to the selected test parameter between the apparatus and the device under test.

Conventional scripted tests generally use a fixed set of test parameters and follow the same sequence each time the test is run. While this type of test is useful for testing known problem areas and for establishing a reference baseline for multiple tests, it has been found that a conventional scripted test is unlikely to disclose problems which are not contemplated by the test designer. The structure of the test and the selection of test parameters are often influenced by the experiences or biases of the person creating the test with respect to the importance of certain test parameters and the likelihood of certain error conditions. Furthermore, it has been found that while a scripted test may be effective for a particular device or device type, subsequent device changes and developments may render the test ineffective. In addition, it has been found that when a scripted test is used during the development of a device to identify and diagnose errors and the device is modified to decrease or eliminate errors identified by the test, the original test may not identify new errors which result from the modifications. This problem is of particular importance in the case where an individual parameter may not cause an error, but certain sequences of parameters or conditions cause errors.

In diagnosing problems with a storage device, one factor is the existence of a group of errors which seem to be related. In testing a given command, repeated errors that are associated with a related group of command variables indicates that the problem is associated with the values of the variables. For example, the execution of a sequence of read commands that cause information to be read from several closely associated locations on the storage medium may result in a number of errors. However, since most scripted tests do not test every possible combination of test parameters, it is unlikely that the scripted test would identify the group of errors unless the test designer considered that command-location combination likely to present a particular problem.

The present invention addresses these problems by dynamically modifying the testing process to adjust to each device being tested to hunt out such problem areas. In addition, dynamic adaptation may be used to identify new problems which may result from changes or modifications of a device.

In one embodiment of the invention, the initial test parameters are arranged in an array. Test parameters are selected from the array and provided to the device being tested. When an error event occurs in response to the provision of a test parameter, the array of test parameters is modified to increase the probability that the test parameter generating the error will be selected, thus increasing the probability of an error occurring.

In another embodiment, the test parameters are similarly arranged in an array. A seed number is provided to a random number generator which generates a series of numbers which is uniquely related to the seed number. The series of numbers, in conjunction with rules governing the test environment, is used to select test parameters from the array, which are then provided to the device under test. In contrast to a scripted test where the sequence of test parameters is defined by the script, the sequence and selection of test parameters used will vary as different seed numbers are used, resulting in a test having increasing scope as more seed numbers are used.

In another embodiment of the invention, information relating to the test conditions is stored in the device under test during testing to provide reference diagnostic information concerning errors.

The apparatus permits testing of a broader range of conditions and parameter sequences than conventional scripted tests. As a result, the breadth and accuracy of the test results is improved. The apparatus avoids limitations imposed by scripted tests through the use of dynamic modifications and/or the use of random numbers in selecting test parameters and/or sequencing, thus overcoming the drawbacks associated with conventional scripted tests.

Based on the foregoing summary, a number of salient features of the present invention are readily discerned. The apparatus may adapt the testing of the device in response to the errors which occur, allowing the test to focus on potential device faults, even if errors or the potential fault were not anticipated by the creator of the original test. The use of a random number generator in conjunction with a seed number allows for a specific test sequence to be replicated by use of the same seed number, while use of different seed numbers allows for variation in testing sequence, thus assisting in identifying unsuspected problem areas. The use of reference information during testing assists in the diagnosis of the cause of errors.

Additional advantages of the present invention will become readily apparent from the following discussion, particularly when taken together with the accompanying drawings.

BRIEF DESCRIPTION OF THE DRAWINGS

FIG. 2 is a chart illustrating dynamic modification of an array of test parameters in response to errors;

FIG. 4 is a chart illustrating a change in the weighting of an array of test parameters in response to an error.

DETAILED DESCRIPTION

Figure 1:
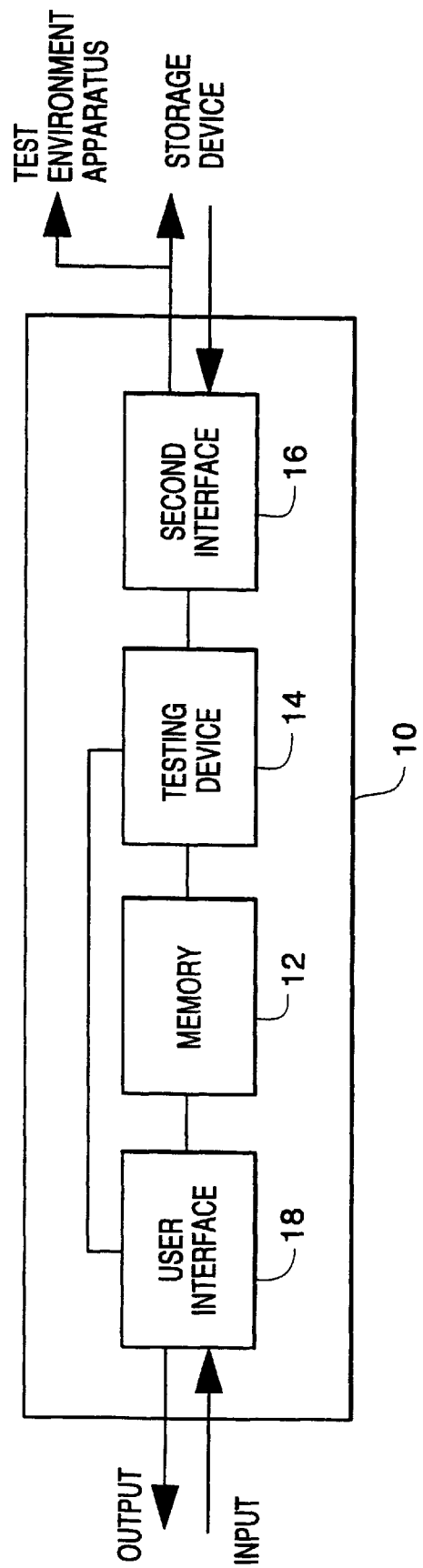
FIG. 1 is a block diagram of an apparatus according to the present invention.

FIG. 1 is a block diagram of a digital computer for testing digital data storage devices, hereinafter digital computer 10. The digital computer 10 includes a memory for containing a plurality of test parameters, hereinafter memory 12. The digital computer 10 also includes a testing device 14 that selects test parameters from the memory 12, sends the selected test parameters to the storage device being tested or to test environment apparatus via an interface device, hereinafter second interface 16, and receives error information from the device being tested via second interface 16. The digital computer 10 also includes a user interface 18 that receives input information relating to the test from an operator or another device, and transmits output information relating to the test to the operator or other device. In some cases, information relating to the test, such as the sequence of the test and the frequency of the use of each test parameter may be generated by the testing device 14 and output to the operator or another device, such as a recording or logging device through user interface 18.

While the present invention may be adapted for use in connection with a variety of electro-mechanical digital storage devices, the descriptions of the various embodiments which follow generally relate to disk drives.

The test parameters which may be used in the invention cover a broad range. The test parameters can include a set of commands, command variables and test modes (each of which may comprise a group of test parameters or a single parameter) to which the storage device being tested is responsive. Test parameters can also include parameters related to the test environment, such as voltage, temperature, humidity, shock and vibrations. The test parameters can further include any condition or action that may be controlled by the testing apparatus.

While test parameters are generally communicated from the testing apparatus to the storage device itself, test parameter information may also be communicated to other devices. For example, a test parameter relating to heat might be communicated to a separate device for controlling the temperature of the environment in which the storage device is being tested.

The test parameters are generally stored in an array, which may be comprised of a group of arrays of different parameters. In one embodiment of the invention, the testing device 14 uses information resulting from an error event to adapt the test as the errors occur, thus creating dynamic adaptive tests. The adaptation in response to an error event allows the apparatus to "learn" from the testing process. In this context, "learning" means adaptation to increase the likelihood of re-creating the error. The adaptation, therefore, is intended to increase the probability of selecting the test parameters that have previously produced an error. The amount of information which is "learned" increases with the number of test iterations and can be gathered from a single device or a group of devices. Rather than a programmer or operator modifying the test, the sequence of tests is shaped by the device itself and test environment. Dynamic adaptation assists in locating infrequently occurring errors that might otherwise be overlooked or given low priority for analysis. Since dynamic adaptive tests respond without human intervention, the likelihood of exposing these errors is increased.

The testing device 14 increases the noted probability by weighting the array so that the test parameters associated with an error are more likely to be selected by the testing device 14. Specifically, the array or arrays may be weighted to control the probability that a certain parameters or sets of parameters will be used in the course of testing. The weighting of an array may take many forms, and different forms of weighting may be used simultaneously. One means of weighting an array is by controlling the number of times that a given parameter appears in the array. If each location in the array has an equal chance of being selected, as would be the case with random selection, the probability that a given parameter will be selected is proportional to the number of locations in the array in which that parameter appears. If all parameters in the array have an equal probability of being selected, the array is equally weighted. Greater weight on a given parameter is equivalent to increased probability of selection of that parameter. The effect of weighting an array may also be achieved by logic in the operation of the test apparatus which causes certain parameters to be selected with greater or lesser frequency than other parameters.

Weighting may vary for particular types of test parameters, or for specific parameters. For example, an array of commands might be heavily weighted towards the selection of particular commands while an array of related command variables might be evenly weighted. FIG. 2 illustrates an example of dynamic adaptive testing of a hard disk drive by the digital computer 10. When an error condition associated with a cylinder of the drive is detected, the array of the test parameters is modified to increase the probability of selecting the cylinder that has an error condition. In FIG. 2, each numbered column represents a different iteration of the cylinder number array. The testing device 14 initially contains in the memory 12 (column 0) an array of test parameters for the command variable "cylinder". The initial iteration of the array, shown in column 0, contains a single number for each cylinder. Consequently, the chance of any given cylinder being selected during the initial iteration is therefore 1 of 1024. Therefore, in this case the initial weighting of cylinder numbers in the array is equally distributed, although other initial weightings may be used if desired. The testing device 14 select parameters from the array and provides the parameter to the second interface 16 which communicates the cylinder number and associated information to the device being tested.

In the instant example, an error event occurred on cylinder number 9. The testing device 14, after receiving the information associated with the error event from the storage device under test through the second interface 16, causes the cylinder number array to be modified to add an additional entry for cylinder number 9, as shown in column 1. As a result, the chance that the error cylinder, number 9, will be selected is increased to 2 of 1025, therefore weighting cylinder number 9 more heavily. Columns 2 through 5 represent the successive modifications of the cylinder number array resulting from repeated errors on cylinder number 9. It should be appreciated that any number of iterations may be used, and that any modified condition may be saved for use as a subsequent initial condition. However, in the instant example, up to five entries per cylinder are added. On the sixth error, all of the variables with that cylinder value are removed, as shown in column 6, thus illustrating the possibility of further modifying the test to increase the probability of selecting the other cylinders. The test results may be communicated to an operator or saved to a memory device through the first interface 18.

Figure 3:
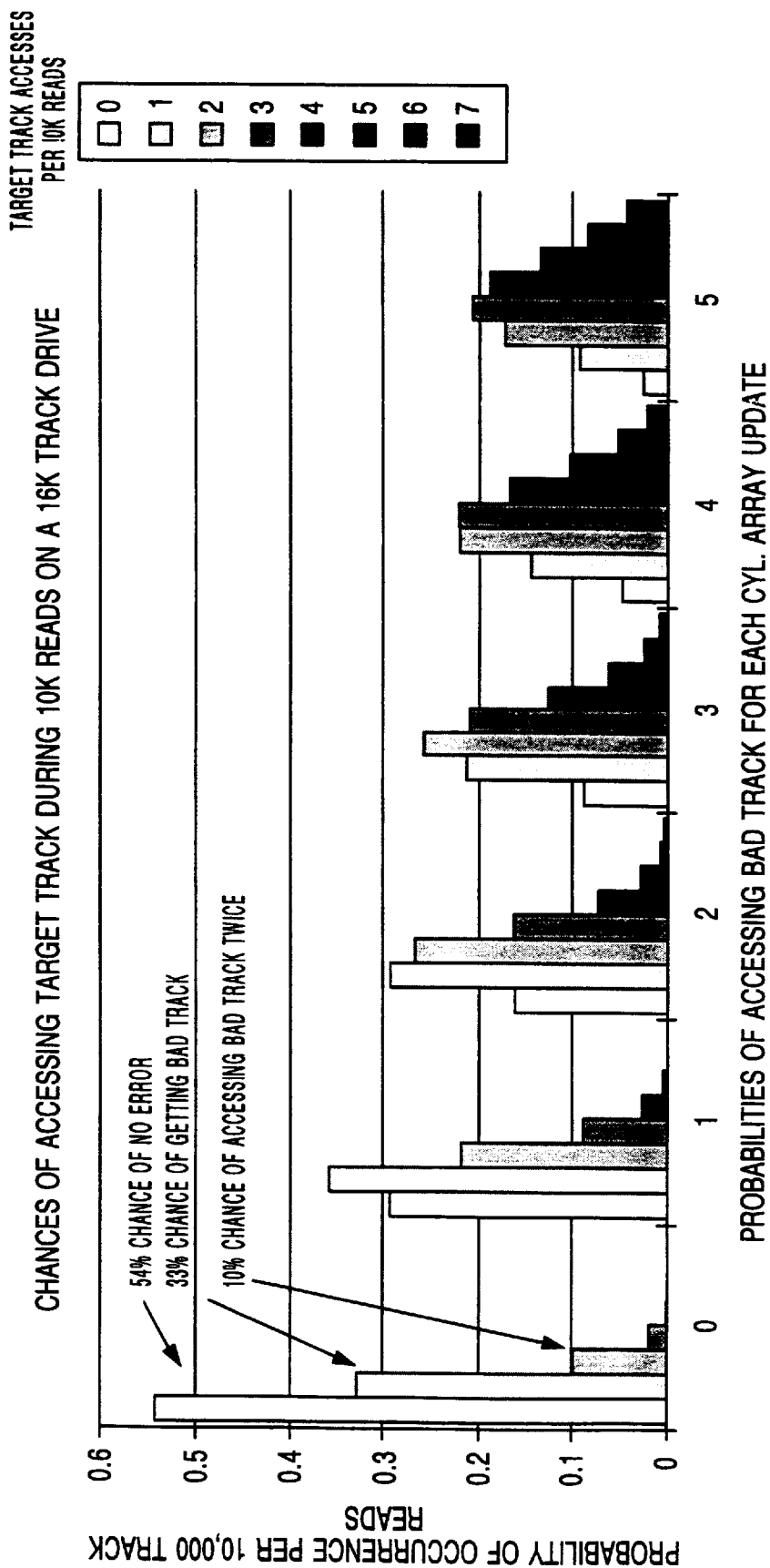
FIG. 3 is a graph illustrating changes in probabilities resulting from successive dynamic modification of an array of test parameters in response to errors.

In the example illustrated in FIG. 2, before any errors occur each cylinder has an equal likelihood of selection. As errors occur, the cylinder number is copied and appended to the list. FIG. 3 graphically shows the increased likelihood of selecting the targeted error cylinder after each iteration. The procedure associated with the cylinder number example may be applied to any array of commands, command variables, or other test parameters.

A dynamically adaptive test may also be combined with a conventional scripted test. In such an embodiment, testing may consist of two phases. The one phase consists of a dynamic adaptive test which tests known areas of weakness associated with a device. This phase tests a range of commands and variables but may be weighted toward detecting known weakness in a device type. The test is adapted in response to errors to focus on problems. Testing for each unit of a device type may start with the same weighting but each test progresses into a unique weighting as errors are detected. One object of this type of test is to identify device faults while devices are still operating within their specifications.

The other phase measures the error rate of a predetermined fixed set of test parameters. This testing is not dynamically modified and may be used as a reference to measure the ongoing quality of a series of devices.

Dynamically adaptative tests can provide improvements in testing efficiency, particularly in view of increases in storage device capacities and testing requirements. Dynamic adaptation in response to errors allows the test to focus on potential faults in the device. In addition, storage devices generally have failure modes. While an adaptive test may not be able to fix the problem, it can identify and test to the failing mode.

Another embodiment of the invention employs a random number generator in the testing device 14 to randomly select test parameters to provide greater variability in testing and reduce the effect of biases or errors which may be built into the test structure. The random number generator is actually "pseudo random" in that the number sequence it produces appears to be random but is actually a predetermined sequence which is related to a seed number. For every unique seed number, a corresponding unique random sequence is generated. Therefore, the sequence of the random number generator can be repeated by using the same seed number and varied by use of different seed numbers. This form of random number sequencing provides comprehensive coverage of test conditions while still preserving the test's repeatability. A truly random number generator could also be used, but the ability to repeat a specific test might be impaired.

Randomized selection of test parameters using a random number generator permits comprehensive test coverage of commands, command variables and operating conditions within the test environment of a particular device. Randomized selection minimizes the effect of logic errors, omissions and redundancies often found in scripted tests by defining the test environment rather than individual scripts. Each test is unique yet repeatable by controlling the seed number used. The test conditions are essentially random but may still be controlled by the probability established by rules.

Randomized selection is also useful in testing changed or modified devices. Some of the changes which may effect the testing conditions are changes in encoding, data transfer, seeking, and data zones. Changes can occur across the entire range of device design including mechanics, electronics and firmware. It has been found that an effective test for identifying design weaknesses should be flexible enough to respond to error conditions as they occur. Use of different random sequences maximizes test coverage while minimizing errors and biases which may occur in traditional scripted tests.

In one embodiment using randomized selection, a set of rules governing the test environment is used in conjunction with number sequences produced by a random number generator to select the test parameters which are used. The sequence of the test is varied for each different seed number which is used, thus providing more coverage than traditional scripted tests where the sequence is fixed. In cases where multiple devices are being tested, variation in total test coverage may be increased by using a unique number associated with each device, such as the serial number of the device, as the seed number for the test of that device.

The initial rules for the test environment may be established in several ways, such as by weighting arrays of test parameters, by establishing ranges for test parameters, or by program logic. The weighting of an array may be determined by the number of copies of the parameter which are stored in the array. Each location in the array typically has an equal chance of being selected. For example, in the case of an array of commands, the array may be loaded with multiple copies of a command based on the percentage of its desired execution. The array might contain 20% read commands, 15% write commands, 5% format commands, and the remaining 60% distributed among other commands, corresponding to the desired probability of selection of each command.

An example of initial rules for a test environment for testing a disk drive follows. For clarity, the test environment is limited to data read and write commands and the weighting is merely exemplary. Data read and write commands comprise three elements:

1. The Command (Read or Write)
2. The Location (LBA)
3. The Data Transfer Size (Blocks)

The rules for commands, established by weighting an array of commands, are:

| | |
|---|---|
| Read Sectors | 35% |
| Write Sectors | 15% |
| Read Multiple Sectors | 15% |
| Write Multiple Sectors | 10% |
| Read Verify | 15% |
| Write Verify | 10% |

The rules for LBA sequencing, similarly established by weighting an array, are:

| | |
|---|---|
| Random LBA | 35% |
| Sequential Forward | 20% |
| Sequential Reverse | 5% |
| Same LBA | 20% |
| Previous LBA | 20% |

The rule for Blocks is any random value between 1 and 256.

In the case of this test environment, the percentages associated with the test parameters reflects the probability that the test parameter will be selected if a random selection is made from the array. In the case of the range specified for Blocks, the weighting is even.

After the rules for the test environment have been established, the portion of the test relating to the defined test environment may be initiated. A seed number is supplied to the random number generator in the test device 14. A seed number may be supplied to the random number generator as input information through the user interface 18, and may be input by an operator or obtained from another source, such as a test database or from the storage device being tested. The use of a serial number or other unique number associated with the particular storage device being tested has been found to be an effective way to establish a unique test sequence for each device.

After receiving the seed number, the random number generator in the test device 14 begins to generate a unique sequence of numbers which is associated with the particular seed number. Numbers from the generated sequence are then used to select test parameters from the array of test parameters in the memory 12. Use of a number or numbers from the generated sequence to select a parameter in the array may be accomplished in many ways. In the case of a one dimensional array, or list, each address in the array may be identified by a number, and the parameter located at that address will be selected every time that number is generated by the random number generator. Similarly, two consecutive numbers from the generated sequence may be used to specify the address of a parameter in a two-dimensional array. While many other means of selecting a parameter using numbers from the generated sequence may be used, it is beneficial to avoid the use of methods which restrict the essentially random nature of the selection.

After a parameter or group of related parameters have been selected, they are communicated to the storage device under test via the second interface 16. If an error occurs, information relating to the error is sent from the storage device to the testing device 14 by the second interface 16. The error information may be logged or stored by the digital computer 10, and may also be output through first interface 18 to an operator or to another system or device.

One of the benefits of using randomized selection in a test is that it is unpredictable, and therefore has the potential to identify problems which might not otherwise be contemplated by a test designer. However, in some cases, certain parameters or groups of parameters may not be used in a test unless certain preexisting conditions are established. In a traditional scripted test, if the test designer has knowledge of the required parameter sequence, the fixed sequence of the test can be established to avoid problems. In the case of randomized selection, where the sequence is not fixed, logic may have to be built into the test to avoid situations where the selected parameters may not be executed in the sequence that would otherwise be attempted as a result of the random selection. The test must therefore have logic to "back check" the executed commands to determine if other valid test conditions were created.

For example, the Read sectors and Read Multiple sectors commands generally allow for an opportunity to compare data. If a Read sectors command was executed at the "Same LBA" as a Write, sectors command a comparison may be performed. There is a similar situation if the read location matches the "Previous LBA". Logic may be included in the test to check the previous commands and LBA's to determine if permissible conditions for a compare exist. The values are checked to determine if a compare can be performed. The command is executed and checked for errors. If valid data compare conditions exist the data is compared.

In another embodiment, dynamic adaptation may be combined with randomized selection in a test. The dynamic adaptation permits the test to focus on problem areas, while the randomized selection permits broader coverage of the test for potential errors. An example involving a device having ten cylinders is shown in FIG. 4. The initial rules for the test environment are established by weighting an array of cylinder numbers in the memory 12. Initially, as shown in column 1 of FIG. 4, each cylinder is associated with a group of numbers, which establishes the initial weighting for that cylinder. This weighting is the equivalent of a one dimensional array where the test parameter for cylinder number 1 is stored in array locations 1 through 10, cylinder number 2 is stored in locations 11 through 20, and similarly for the remaining cylinder numbers. In the example shown in column 1, each cylinder has ten numbers associated with it, initially establishing an equal probability of selection, or even weighting. Although in this example the initial condition shows a single type of test parameter and the parameters are initially evenly weighted, multiple types of parameters could be used and the initial weighting could be established in any manner.

After the initial test environment has been established, a seed number is supplied to the random number generator in the testing device 14. After receiving the seed number, the random number generator in the test device 14 begins to generate a unique sequence of numbers which is associated with the particular seed number. In this example, the random number generator is limited to producing numbers from 1 to 100. Numbers from the generated sequence are then used to select test parameters from the array of test parameters in the memory 12. Each number therefore corresponds to a specific test parameter. For example, if the random number generator generates the number 45, cylinder number 5 is selected.

After a parameter is selected, it is communicated to the second interface 16 and then sent to the storage device being tested. If an error occurs, information relating to the error is sent from the storage device under test to the testing device 14 via the second interface 16. The information received from the device is then used to modify the weighting of the test parameters. The error information may also be logged or stored or output through first interface 18 to an operator or to another system.

During the initial operation of the test, the probabilities of accessing any cylinder are equal. When an error occurs, the weighting is modified to change the probabilities of subsequent selection. Column 2 of FIG. 4 illustrates a change in weighting resulting from an error on cylinder number 8. In response to the error information received through second interface 16, the weighting is modified as shown in column 2 to increase the probability of selection of cylinder number 8. The weighting is modified by taking 5% from each of the error free cylinders and adding it to the error cylinder, number 8. Thereafter, until the weighting is modified again, the generation of numbers from 36 to 90 causes cylinder number 8 to be selected while all other cylinders have five chances in a hundred of being selected. The modification in the weighting illustrates the ability of the present invention to focus on an error test condition. The illustrated means for modifying weighting can be applied to any test parameter, and used with other ranges of random numbers or percentages or other variables.

In yet another embodiment of the invention, information relating to the test conditions is written to the storage device being tested during the test. This reference information may provide useful information for diagnosis of causes of errors. The use of reference information improves the speed and effectiveness of failure analysis by including the information in the data written to the storage device during testing. While the reference information may include test parameters and may also include other information, some of the information which has been found to be useful includes the identity of the test or test segment; the seed number for tests involving random number generators; the command and command variables; the time or a command counter; the command environment; and voltage, temperature and humidity conditions. If reference information is stored in the storage device during testing, the information relating to an error condition is available at the time the cause of the error is diagnosed. The availability of this reference information frequently eliminates the need for extensive retest and reduces time on logic analyzers and emulators. An engineer with access to the relevant reference data may more easily identify and correct the problem. The reference information may be received through second interface 16 and output to an operator or to another system through the user interface 18.

The present invention permits the incorporation of various tests types in a single test. A given test might include conventional scripted tests, dynamically adaptive tests, randomized tests or randomized dynamic adaptive tests. The invention may be used to test a single device or a series of devices.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described hereinabove are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. An apparatus for testing an electro-mechanical digital storage device, comprising:
    a digital computer;
    first interface means, located within said digital computer, for transferring information relating to a test of the electro-mechanical digital storage device with an operator or another device;
    an array of test parameters for the electro-mechanical digital storage device located within said digital computer;
    second interface means, located within said digital computer, for transferring information relating to said test parameters with the electro-mechanical digital storage device; and
    testing means, for selecting a test parameter, for providing the selected test parameter to the electro-mechanical digital storage device via the second interface means, for receiving information relating to an error event from the electro-mechanical digital storage device via the second interface means, and for modifying said array of test parameters in response to the information relating to an error event to change the probability that a specific test parameter will be selected.

2. An apparatus, as claimed in claim 1, wherein:
    said test parameters comprise commands and command variables.

3. An apparatus, as claimed in claim 1, wherein:
    said test parameters comprise commands, command variables, and test conditions.

4. An apparatus, as claimed in claim 1, wherein:
    said testing means comprises a random number generator for use in selecting a test parameter.

5. An apparatus, as claimed in claim 1, wherein:
    said testing means comprises a random number generator for selecting a test parameter, wherein said random number generator is responsive to a seed number.

6. An apparatus, as claimed in claim 1, wherein:
    said testing means uses a seed number to select a test parameter; and
    said first interface means comprises means for receiving said seed number.

7. An apparatus, as claimed in claim 1, wherein:
    said testing means comprises a random number generator for use in selecting a test parameter, wherein said random number generator is responsive to a seed number; and
    said first interface means comprises means for receiving said seed number.

8. An apparatus, as claimed in claim 1, wherein:
    said testing means comprises means for weighting said array of test parameters in response to the information relating to an error event to increase the probability that said specific test parameter will be selected.

9. An apparatus, as claimed in claim 1, wherein:
    said testing means comprises means for weighting said array of test parameters in response to the information relating to an error event to decrease the probability that said specific test parameter will be selected.

10. An apparatus, as claimed in claim 1, wherein:
    said testing means comprises means for weighting said array of test parameters in response to the information relating to an error event to change the probability that a specific type of test parameter that includes said specific test parameter will be selected.

11. An apparatus, as claimed in claim 1, wherein:
    said testing means comprises means for weighting said array of test parameters in response to the information relating to an error event to increase the probability that a specific type of test parameter that includes said specific test parameter will be selected.

12. An apparatus, as claimed in claim 1, wherein:
    said testing means comprises means for weighting said array of test parameters in response to the information relating to an error event to decrease the probability that a specific type of test parameter that includes said specific test parameter will be selected.

13. An apparatus, as claimed in claim 1, wherein:
    said testing means comprises means for weighting said array in response to an error event by adding a test parameter associated with said error event to said weighted array.

14. An apparatus, as claimed in claim 1, wherein:
    said testing means comprises means for weighting said array in response to an error event by changing the weight of each type of test parameter represented in said weighted array.

15. An apparatus, as claimed in claim 1, further comprising:
    a plurality of arrays of test parameters located within said digital computer.

16. An apparatus, as claimed in claim 1, further comprising:
    a plurality of arrays of test parameters located within said digital computer; and said testing means comprises means for selecting at least one of said arrays.

17. An apparatus, as claimed in claim 1, further comprising:

a fixed set of test parameters located within said digital computer.

18. An apparatus for testing an electro-mechanical digital storage device, comprising:

a digital computer;

first interface means, located within said digital computer, for receiving a seed number;

a plurality of test parameters for the electro-mechanical digital storage device located within said digital computer;

testing means, located within said digital computer, for using said seed number to select one of said plurality of test parameters, wherein said testing means includes a number generator capable of repetitively producing a pseudo-random series of numbers in response to the receipt of said seed number, wherein a number in said pseudo-random series of numbers is used to select a test parameter; and second interface means, located within said digital computer, for transferring information relating to said selected test parameter with said electro-magnetic digital storage device.

19. An apparatus, as claimed in claim 18, wherein:

said seed number is associated with the identity of the device being tested.

20. An apparatus, as claimed in claim 18, wherein:

said test parameters comprise commands and command variables.

21. An apparatus, as claimed in claim 18, wherein:

said test parameters comprise commands, command variables, and test conditions.

22. An apparatus, as claimed in claim 18, wherein:

said testing means comprises means for selecting a sequence of said test parameters.

23. An apparatus, as claimed in claim 18, wherein:

said testing means comprises means for selecting a sequence of said test parameters and means for determining if said sequence of test parameters is a permissible condition for the electro-mechanical digital storage device.

24. An apparatus, as claimed in claim 18, wherein:

said first interface means comprises means for receiving information relating to said test parameters.

25. An apparatus, as claimed in claim 18, wherein:

said second interface means comprises means for receiving information relating to an error event in the electro-mechanical digital storage device during the testing thereof.

26. An apparatus, as claimed in claim 18, wherein:

said first interface means comprises means for outputting information relating to the testing of the electro-mechanical digital storage device.

27. An apparatus, as claimed in claim 18, wherein:

said plurality of test parameters includes a plurality of arrays of test parameters located within said digital computer.

28. An apparatus, as claimed in claim 18, wherein:

said plurality of test parameters includes a plurality of arrays of test parameters located within said digital computer; and said testing means further comprises means for selecting at least one of said arrays for use in testing the electro-mechanical digital storage device.

29. An apparatus, as claimed in claim 18, wherein:

said plurality of test parameters comprises an array of test parameters; and said testing means comprises means for weighting said array in response to an error event in the electro-mechanical digital storage device.

30. An apparatus, as claimed in claim 18, wherein:

said plurality of test parameters comprises a weighted array of test parameters.

31. An apparatus, as claimed in claim 18, wherein:

said plurality of test parameters comprises an array of test parameters; and said testing means comprises means for weighting said array in response to an error event to change the probability that a specific test parameter will be selected.

32. An apparatus, as claimed in claim 18, wherein:

said plurality of test parameters comprises an array of test parameters; and said testing means comprises means for weighting said array in response to an error event to change the probability that a specific type of test parameter will be selected.

33. An apparatus, as claimed in claim 18, wherein:

said plurality of test parameters comprises a weighted array of test parameters; and said testing means comprises means for modifying said weighted array in response to an error event.

34. An apparatus, as claimed in claim 18, wherein:

said plurality of test parameters comprises a weighted array of test parameters; and said testing means comprises means for modifying said weighted array in response to an error event by changing the weight of each type of each test parameter represented in said weighted array.

* * * * *